US011738746B2

(12) United States Patent
Jewell

(10) Patent No.: US 11,738,746 B2
(45) Date of Patent: Aug. 29, 2023

(54) LIFEFORM TRANSMISSION SYSTEM FOR COLLISION AVOIDANCE

(71) Applicant: Ted Jewell, Walled Lake, MI (US)

(72) Inventor: Ted Jewell, Walled Lake, MI (US)

(*) Notice: Subject to any disclaimer, the term of this patent is extended or adjusted under 35 U.S.C. 154(b) by 485 days.

(21) Appl. No.: 16/898,257

(22) Filed: Jun. 10, 2020

(65) Prior Publication Data

US 2020/0398834 A1 Dec. 24, 2020

Related U.S. Application Data

(60) Provisional application No. 62/983,705, filed on Mar. 1, 2020, provisional application No. 62/910,276, filed on Oct. 3, 2019, provisional application No. 62/863,364, filed on Jun. 19, 2019.

(51) Int. Cl.
| | |
|---|---|
| *B60W 30/095* | (2012.01) |
| *H04W 4/40* | (2018.01) |
| *G01S 13/42* | (2006.01) |
| *G06V 20/56* | (2022.01) |

(52) U.S. Cl.
CPC ......... *B60W 30/0956* (2013.01); *G01S 13/42* (2013.01); *G06V 20/56* (2022.01); *H04W 4/40* (2018.02); *B60W 2554/4029* (2020.02)

(58) Field of Classification Search
CPC ..... B60W 30/0956; B60W 2554/4029; B60W 2554/40; G01S 13/42; G06V 20/56; G06V 20/58; H04W 4/40
See application file for complete search history.

(56) References Cited

U.S. PATENT DOCUMENTS

| | | |
|---|---|---|
| 5,181,027 A | 1/1993 | Shafer |
| 6,269,763 B1 | 8/2001 | Woodland |
| 6,643,579 B1 | 11/2003 | Gutierrez |
| 6,731,202 B1 | 5/2004 | Klaus |
| 7,061,401 B2 | 6/2006 | Voos et al. |
| 7,679,530 B2 | 3/2010 | Waquet |
| 8,554,392 B2 | 10/2013 | Del Santo |
| 8,587,770 B1 | 11/2013 | Johnston et al. |
| 8,810,436 B2 | 8/2014 | Zagami et al. |
| 9,037,391 B2 | 5/2015 | Meyer et al. |
| 9,237,855 B2 | 1/2016 | Hong et al. |
| 9,655,390 B2 | 5/2017 | Davis |
| 9,658,068 B2 | 5/2017 | Troxler |
| 9,738,253 B2 | 8/2017 | Czyz et al. |

(Continued)

*Primary Examiner* — Ig T An
(74) *Attorney, Agent, or Firm* — Gerald R. Black, Esq.

(57) ABSTRACT

A lifeform transmission system is used to locate a lifeform wanting to be identified as a lifeform for collision avoidance. The lifeform transmission system comprises a lifeform vitals detector, a GPS transmitter and various other electrical circuits. The lifeform transmitter is worn on a limb or neck of the lifeform. If the lifeform does not wear a transmitter no signal is emitted. The collision avoidance system is housed inside the vehicle and receives communication from invention. If any lifeform is positioned in the path or approaching the path that the ground vehicle is traveling, the vehicle's collision avoidance system is advised to avoid the collision to enhance the accuracy of the collision avoidance system. This invention complements the existing collision avoidance system and enhances the accuracy of vehicle systems by providing an input from the lifeform, making detection easier.

20 Claims, 15 Drawing Sheets

(56) References Cited

U.S. PATENT DOCUMENTS

| | | | |
|---|---|---|---|
| 9,805,601 B1* | 10/2017 | Fields | G08G 1/0129 |
| 9,826,415 B1* | 11/2017 | Byrne | G08B 25/14 |
| 9,908,470 B1 | 3/2018 | Englander et al. | |
| 10,036,801 B2 | 7/2018 | Retterath et al. | |
| 10,049,582 B2 | 8/2018 | Hashizume et al. | |
| 10,198,956 B2 | 2/2019 | Silverman | |
| 2004/0258279 A1 | 12/2004 | Hirvonen et al. | |
| 2005/0278088 A1 | 12/2005 | Thorner | |
| 2008/0094212 A1 | 4/2008 | Breed | |
| 2008/0238636 A1 | 10/2008 | Birging et al. | |
| 2009/0309714 A1 | 12/2009 | Baruco et al. | |
| 2011/0144912 A1 | 6/2011 | Lee et al. | |
| 2011/0184617 A1 | 7/2011 | Hegermann et al. | |
| 2013/0321169 A1 | 12/2013 | Bateman et al. | |
| 2015/0029050 A1 | 1/2015 | Driscoll et al. | |
| 2015/0109148 A1 | 4/2015 | Cheatham et al. | |
| 2015/0183431 A1 | 7/2015 | Nanami | |
| 2016/0003933 A1 | 1/2016 | Calmettes et al. | |
| 2016/0247407 A1 | 8/2016 | Paczan et al. | |
| 2016/0299224 A1 | 10/2016 | Stobbe | |
| 2017/0088261 A1* | 3/2017 | Sequeira | G08G 5/00 |
| 2018/0072313 A1* | 3/2018 | Stenneth | G01S 17/89 |

* cited by examiner

LIFEFORM TRANSMISSION
SYSTEM FOR GROUND VEHICLE

LIFEFORM DETECTION USING GROUND VEHICLE

LIFEFORM DETECTION USING AIRCRAFT w/ GROUND VEHICLE

LIFEFORM DETECTION USING WATERCRAFT w/ GROUND VEHICLE(S)

LIFEFORM DETECTION USING AIRCRAFT AND WATERCRAFT

LIFEFORM TRANSMISSION SYSTEM FOR COLLISION AVOIDANCE

This application is related to and claims priority to U.S. Provisional Application No. 62/863,364, entitled "Lifeform Detection for Collision Avoidance System" (Jewell), filed on Jun. 19, 2019; and U.S. Provisional Application No. 62/910,276, entitled "Lifeform Detection for Collision Avoidance System" (Jewell), filed on Oct. 2, 2019; and U.S. Provisional Application No. 62/983,705 entitled "Lifeform Detection for Collision Avoidance System" (Jewell), filed on Mar. 1, 2020.

FIELD OF THE DISCLOSURE

A lifeform presence/transmission system that emits a locating signal for vehicle to use and therefore prevents crash/accident with lifeform. This signal can also be used by other systems to locate the lifeform for search and rescue operation at land or sea.

BACKGROUND OF THE INVENTION

Ground vehicles (cars, school buses, public transportation, trucks, and the like), watercraft (boats, marine vehicles, and the like), and aircraft (drones, helicopters), airplanes, and the like), are now coming equipped with technological systems for collision avoidance. However, although safety for the driver and passengers of the vehicles are becoming safer, those outside of the vehicle or in the path of the vehicles are increasingly injured or killed by collisions. Radar retroreflectors may be detected by such systems and may be used to "mark" the locations of pedestrians to avoid collisions—for example, swimmers, small children or pets, road construction workers, a police officer pulling over a vehicle, a disabled vehicles where the operator is changing a tire, children exiting a school bus, vehicle repair persons, and persons with disabilities who may be unaware of vehicles in their vicinity.

The number of pedestrians killed along U.S. roadways last year climbed to the highest level since 1990, according to a new report. An estimated 6,227 pedestrians were killed in 2018, an increase of 250 from 2017, the Governors Highway Safety Association reported. The Association based its estimate on data collected by state highway safety offices. U.S. pedestrian fatalities have increased 41% since 2008 and now account for 16% of all traffic fatalities.

- 5,977 pedestrians were killed in traffic crashes in 2017 in the United States. This averages to one crash-related pedestrian death every 1.5 hours.
- Also, almost 137,000 pedestrians were treated in emergency rooms for non-fatal crash-related injuries in 2017. Pedestrians are 1.5 times more likely than passengers to be killed in a car crash.
- Persons aged 65 and older accounted for 20% of all pedestrian deaths in 2016 and an estimated 10% of all pedestrians injured in 2017.
- About 20% of the children under the age of 15 who were killed in traffic crashes in 2017 were pedestrians. The source of all of this data is published by the CDC, Motor Vehicle Safety, Pedestrian Safety at https://www.cdc.gov/motorvehiclesafety/pedestrian_safety/index.html).

For starters, America's growing love affair with pickups, SUVs and crossover utility vehicles means pedestrians are being hit by bigger, heavier, and more powerful vehicles. As a result, pedestrians who are hit are more likely to die or suffer life-threatening injuries, the association said. Pedestrian fatalities involving SUVs jumped by 50% between 2013 and 2017, it estimates. Another factor is the growing population in many states, which has led to more deadly encounters between drivers and pedestrians. The report also blames people being distracted by their smartphones and not being focused on the road as contributing to pedestrian fatalities. Add in a strong economy with relatively cheap gas prompting more people to drive more miles and it's a deadly recipe for people walking along roads or crossing streets.

Ten automakers reported equipping more than half of the vehicles they produced in 2018 with automatic emergency braking (AEB) according to the National Highway Traffic Safety Administration (NHTSA) and the Insurance Institute for Highway Safety (IIHS). This is the second update of manufacturer progress toward equipping every new passenger vehicle with the crash avoidance technology by Sep. 1, 2022. The 10 manufacturers include many high-volume automakers, such as Honda, Nissan and Toyota. Three manufacturers—Mercedes-Benz, Tesla and Volvo—report 93% or higher conformance with the voluntary commitment, with Tesla at 100%.

Although sensors are increasingly used in vehicle collision avoidance technology, sensors are still having problems identifying lifeforms and collisions still occur. According to AAA, Inc., cars with high-tech safety systems are still running people over. The device after emitting a signal identifying the wearer as a lifeform, will inform the vehicle it is receiving a signal there is a lifeform in the area although the other sensing systems may not see the lifeform.

Some notable prior art includes the following:

U.S. Patent Document No. 20160003933 (Calmettes; et al.) discloses a system for locating a distress beacon, using a computer implemented method for processing the signal emitted by a distress beacon, The signal being received by several satellites and forwarded to at least one ground station, the method comprising the steps consisting in determining a set of hypothetical positions of the beacon, and for at least one of the hypothetical positions, for each satellite, offsetting the signal received and forwarded as a function of the hypothetical position; summing the offset signals; and evaluating the validity of the sum of the offset signals as a function of the presence of a predefined characteristic in the sum.

U.S. Patent Document No. 20140092249 (Freilburger) discloses a vehicle perimeter detection system for a vehicle having a plurality of sensors provided on an exterior of the vehicle for sensing an object in a peripheral field of view during motion of the vehicle. The plurality of sensors includes a front sensor configured for sensing substantially forward the vehicle, a rear sensor configured for sensing substantially rearward the vehicle; and a side sensor configured for sensing substantially laterally adjacent the vehicle. The perimeter detection system also has a controller for processing the plurality of sensors to detect the object in the peripheral field of view when the vehicle is stopped, such as when a transmission of the vehicle is in park. An output signal is generated that is indicative of the object detected in the peripheral field of view. The output signal may be audible and visual and may include a door lock signal and a window raising signal.

U.S. Patent Document No. 20080238636 (Birging; et al.) discloses a vehicle surveillance system having a plurality of side-light units mounted on opposite sides of a truck, bus, train or a similar long vehicle. The side-light units form an RF communication network on the vehicle. Each side-light unit comprises a day-running light source, a sensor for defining a surveillance zone on the side of said vehicle, said the sensor being arranged to detect an object or a movement of an object within the surveillance zone, and an RF transmitter which is controlled by said sensor and arranged to transmit an RF detection signal from said side-light unit. Existing day-running side-light units of a vehicle may be replaced with the inventive vehicle day-running side-light units.

U.S. Pat. No. 10,109,174 (Troxler) depicts a system for detecting position and proximity. According to one aspect, a computing device includes a processor configured to determine a position coordinate of a first movable device. Further, the processor is configured to determine whether the position coordinate of the first movable device is a predetermined distance from a second movable device. The processor is also configured to signal the second movable device in response to determining that the position coordinate of the first movable device is a predetermined distance from a second movable device.

U.S. Pat. No. 9,237,855 (Hong, et al.) discloses a wearable heart rate monitor. Some embodiments provide a wearable fitness monitoring device including a motion sensor and a photo-plethysmographic (PPG) sensor. The PPG sensor includes (I) a periodic light source, (ii) a photo detector, and (iii) circuitry determining a user's heart rate from an output of the photo detector. Some embodiments provide methods for operating a heart rate monitor of a wearable fitness monitoring device to measure characteristics of a heartbeat waveform.

Cameras, radar, and lidar have limitations when used outdoors for searching and rely on visibility and detection of lifeform. Cameras work poorly at night. Radar does not distinguish well between different types of objects. Lidar can fail completely in rain, snow, or fog. Most importantly it is relying on the vehicle ability to perform the detection, without augmented interaction and communication from outside the vehicle.

SUMMARY OF THE INVENTION

Terms and Definition

The term "lifeform" as used herein refers to an organism such as a human, pet, livestock, or other animal.

The term "lifeform vitals" is any means that confirms a lifeform. It may be biometrics such as body temperature, blood pressure, heartbeat monitor, Fitbit® or equivalent.

The term "vehicle" as used herein refers to any manned or unmanned powered machine that moves along the surface of the land that transports lifeforms, cargo, or both, including but not limited to a car, truck, bus, van, snowmobile, sports utility vehicle, recreational vehicle, or motorcycle. The vehicle is either a land craft, an aircraft (preferably, a plane or helicopter), or a watercraft (preferably, that patrols near coastlines).

The term "collision avoidance system (CAS)" as used herein refers to a pre-crash system, forward collision warning system, or collision mitigating system, designed to prevent or reduce the severity of a collision. This system exists outside our invention, it is however able to receive the signal from the invention. Typically, this system uses radar (all-weather) and sometimes laser and one or more cameras (employing image recognition) or combination to detect presence of a moving object as an imminent or potential crash. This system uses but not limited to camera, thermal imaging camera, lidar, ladar, radar, Wi-Fi, laser, sonar, RFID, 802.11p wireless access in vehicular environments, C v2x, equivalent/similar, or some combination of these to identify lifeforms either in or near a travel path of the vehicle. This system then warns the driver through a system warning and could assist or stop the vehicle when a potential critical situation is detected, and driver of vehicle does not respond.

The term "GPS" as used herein refers to Global Positioning System (GPS) is a worldwide radio-navigation system formed from the constellation of 24 satellites and their ground stations. Global Positioning System tracking is a method of working out exactly where something is. A GPS tracking system, for example, may be placed in a vehicle, on a cell phone, or on special GPS devices, which can either be a fixed or portable unit. GPS works by providing information on exact location. It can also track the movement of a vehicle or person. A GPS tracking system uses the Global Navigation Satellite System (GNSS) network. This network incorporates a range of satellites that use microwave signals that are transmitted to GPS devices to give information on location, vehicle speed, time and direction. So, a GPS tracking system can potentially give both real-time and historic navigation data on any kind of journey. GPS provides special satellite signals, which are processed by a receiver. These GPS receivers not only track the exact location but can also compute velocity and time. The positions can even be computed in three-dimensional views with the help of four GPS satellite signals. The Space Segment of the Global Positioning System consists of 27 Earth-orbiting GPS satellites. There are 24 operational and 3 extra (in case one fails) satellites that move round the Earth each 12 hours and send radio signals from space that are received by the GPS receiver.

The term "Bluetooth®" as used herein refers to a Bluetooth transceiver that operates on Bluetooth protocols. As used herein, Bluetooth includes Bluetooth, ULP Bluetooth (Ultra Low Power Bluetooth), BLE (Bluetooth Low Energy), and other standards sets by Bluetooth SIG.

The main function of the invention is to transmit a locating GPS (or equivalent) signal that is then read by collision avoidance system in a vehicle. This signal is only transmitted when lifeform vitals are identified. This electrical signal is only a transmitting, one-way communication device. The signal changes as the lifeform moves and collision avoidance system can detect this and therefore use it to control the movement of the vehicle. The lifeform may have controls to turn this signal on and off.

The main parts of the lifeform transmission system of the present invention are as follows:
  Lifeform vitals. These are obtained through using sensors and associated electronics. It can be human or nonhuman (pets).
  GPS transmitter/emitter circuit. The lifeform transmission system of the present invention has a GPS receiver that can receive the location data from the satellite.
  Physical attachment/enclosure to house the above elements. Note 1: Software elements are present and integrated into the product. These include but not limited to over the air software updates, monitoring system performance parameters etc. Note 2: Battery and battery charging systems are not shown separately however they are part of system operation.

The main function of the lifeform detection system of the present invention is to make lifeforms outside the vehicle identifiable regarding the proximity of the lifeform and the directional path of the lifeform relative to the directional path of the vehicle. In this way the lifeform detection system of the present invention enhances the accuracy and effectiveness of existing collision avoidance systems, thereby increasing the level of identifiable lifeforms and reducing collisions. If a device is not worn, it cannot register a lifeform and therefore no signal is emitted. While the system main function is to transmit the locating signal, the vehicle system will be able to detect lifeform using this device.

The lifeform transmission system of the present invention relates to a collision avoidance systems in/between existing and future vehicles, or centralized traffic coordinating system, and more particularly, to systems that enable lifeform recognition in the travel path of the vehicle or traveling toward the travel path of the vehicle to be identified or noted as a lifeform by the vehicle to avoid any collision with the lifeform, or notify the driver of the vehicle to use caution, and possibly the autonomous driving features to encourage manual attention, or pull off to the shoulder of the road if driver is un-attentive. The key is the device wearer being registering a lifeform through vital information such as body temperature, pulse, and other lifeform specific vitals identifiers. When the device registers the lifeform, the device emits the signal identifying the lifeform as a lifeform. If this signal is received by a vehicle, the vehicle may communicate to the driver, of lifeform proximity and to use caution. Existing collision avoidance systems may be engaged to stop the vehicle, if the vehicle driver is not able to act quickly. If transmitter device is not worn, it cannot register a lifeform and therefore no signal is emitted. While the system main function is to transmit the locating signal, the vehicle system will be able to detect lifeform using this device.

The lifeform transmission system is used to locate a lifeform wanting to be identified as a lifeform for collision avoidance purposes. The lifeform transmission system comprises a lifeform vitals detector, a GPS transmitter and various other electrical circuits. The invention is worn on a limb or neck of the lifeform. If device is not worn, no signal is emitted. The collision avoidance system is housed inside the vehicle and receives communication from invention. If any lifeform is positioned in the path or approaching the path that the ground vehicle is traveling, the collision avoidance system of the vehicle is advised to avoid the collision to enhance the accuracy of the collision avoidance system. The lifeform transmission system of the present invention complements the existing collision avoidance system and enhances the accuracy of vehicle systems by providing an input from the lifeform, making detection easier.

For a complete understanding of the lifeform detection for collision avoidance system of the present invention, reference is made to the accompanying drawings and description in which the presently preferred embodiments of the invention are shown by way of example. As the invention may be embodied in many forms without departing from spirit of essential characteristics thereof, it is expressly understood that the drawings are for purposes of illustration and description only and are not intended as a definition of the limits of the invention.

DETAILED DESCRIPTION OF THE PREFERRED EMBODIMENTS

Figure 1:
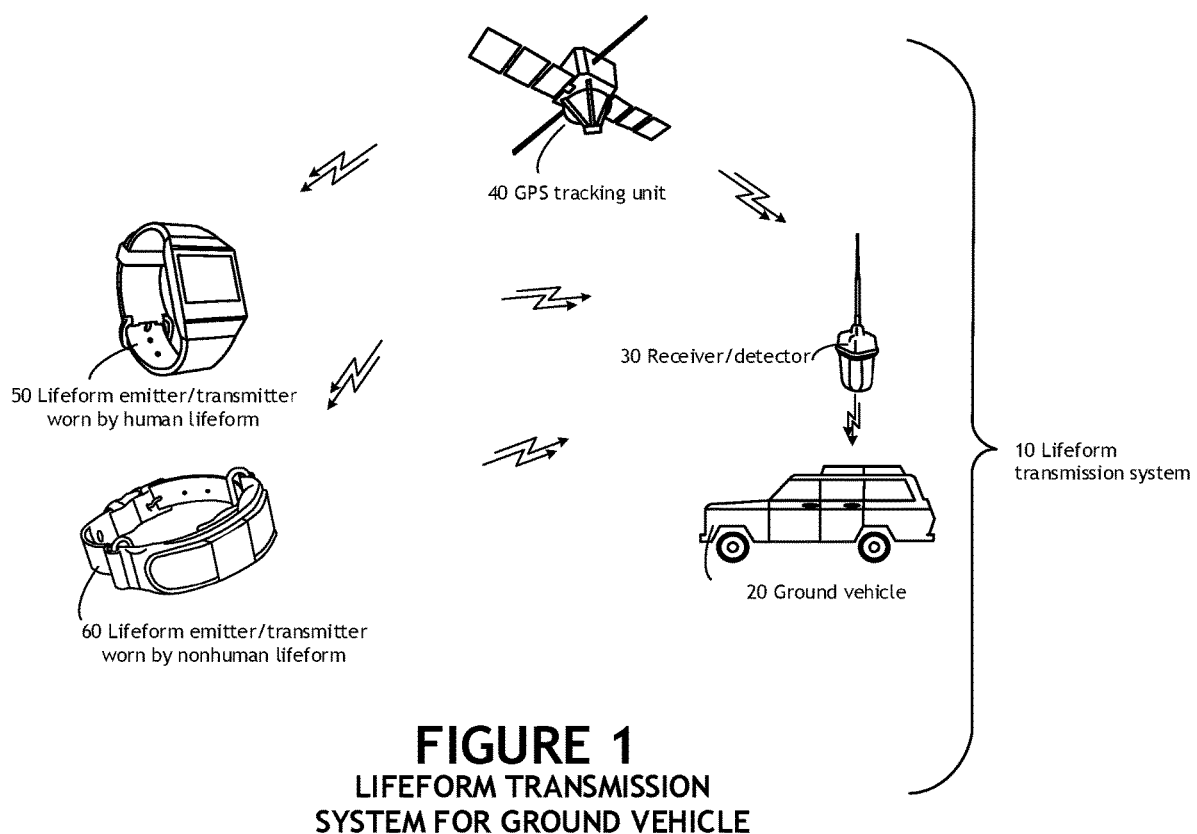
FIG. 1 depicts a first preferred embodiment of a schematic representation of the lifeform transmission system of the present invention with a lifeform detector/receiver being mounted atop a ground vehicle, the lifeform detector/receiver being in one way communication with a global positioning satellite, also depicting a lifeform transmitter/signal emitter for a human lifeform (wearable wrist, collar, backpack etc. device), the lifeform transmission system being in electronic transmit communication with a [30] receiver/detector (can also be collision avoidance system disposed in the ground vehicle.

Referring now to the drawings, FIG. 1 depicts a first preferred embodiment of a schematic diagram of the lifeform transmission system [10] of the present invention, showing a receiver [30] able to receive electrical signals (or equivalent) from a lifeform transmitter worn by a human [50], and another lifeform detector worn by a nonhuman lifeform [60].

Figure 2:
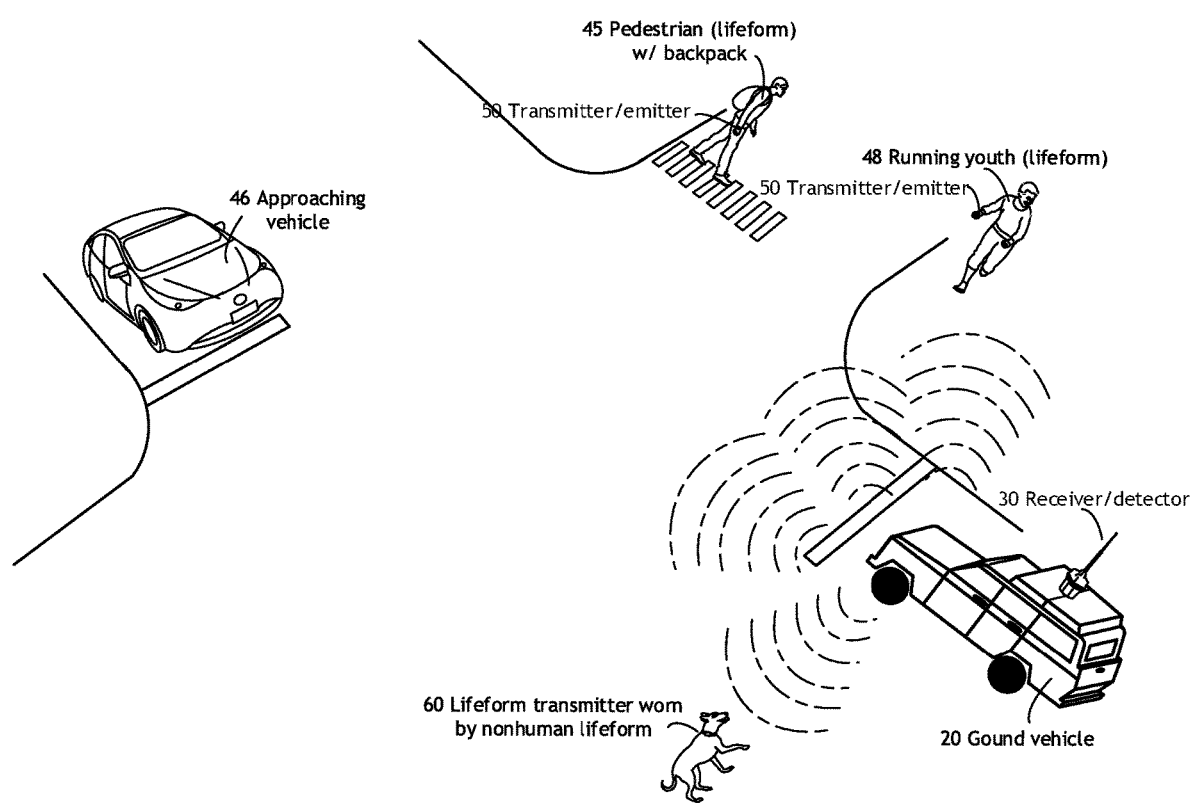
FIG. 2 depicts an environmental representation of the lifeform transmission system represented in FIG. 1, showing a detector/receiver mounted atop a ground vehicle also depicting a lifeform transmitter worn by a human, another lifeform, and an oncoming vehicle, the lifeform detection system being in electronic transmit communication with a collision avoidance system disposed in the ground vehicle.

FIG. 2 depicts an environmental view of the lifeform transmission system of FIG. 1, with the system [10] transmitting the position of a dog in the street wearing a transmitter device [60], an approaching vehicle [46], a pedestrian with a backpack crossing the street [45] wearing transmitter device [50], and a running youth [48] wearing a transmitter device [50].

Figure 3:
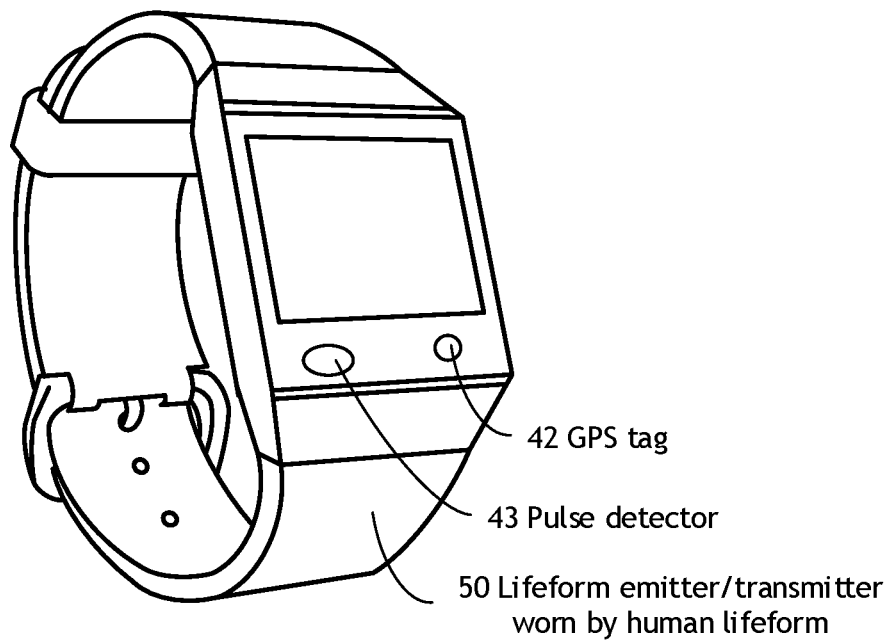
FIG. 3 depicts a simplified exploded view of a lifeform transmitter to be worn on the wrist of a human or app installed on cell phone for the lifeform detection system of FIG. 1.
Figure 4A:
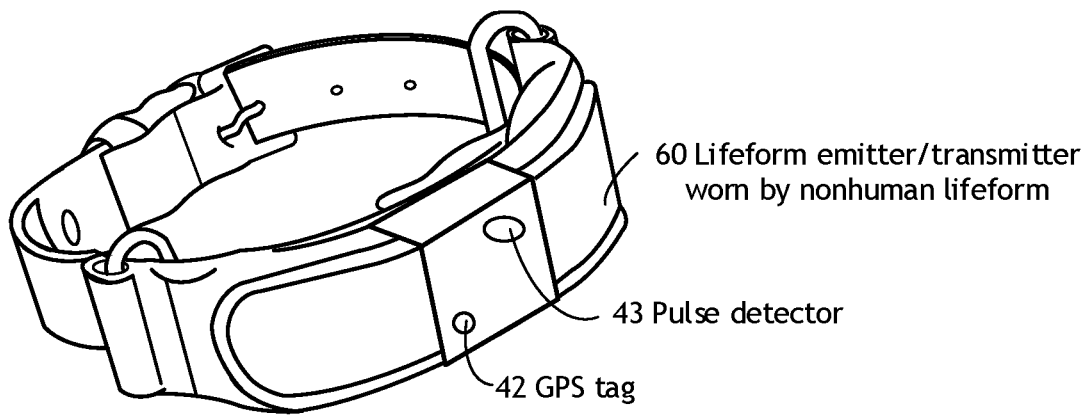
FIG. 4A depicts a simplified exploded view of a lifeform transmitter for the lifeform transmission system of FIG. 1 to be worn around the neck of a pet.
Figure 4B:
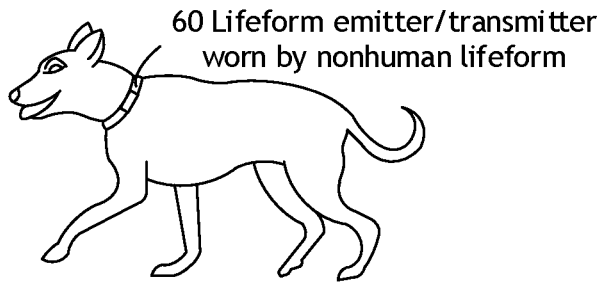
FIG. 4B depicts a dog wearing the lifeform transmitter apparatus of FIG. 4A.

FIG. 3 depicts a simplified exploded view of a transmitter device [50] to be worn on the wrist or ankle of a human of FIG. 1. For purposes of example only, the lifeform transmitter of choice is a Fitbit®, a registered trademark of Fitbit, Inc. The device is a multifunctional electronic device for displaying, measuring, and uploading to the Internet information including time, date, heart rate, global positioning, direction, distance, altitude, speed, steps taken, calories burned, navigational information, changes in heart rate, activity level, hours slept, quality of sleep, and silent wake alarm; computer software for wireless data communication for receiving, processing, transmitting and displaying information relating to fitness, body fat, body mass index; computer software for managing information regarding tracking, compliance and motivation with a health and fitness program. The lifeform transmitter [50 and 60] will each preferably require a power source, a power source charger, software, over the air programming, a physical enclosure, charging ports, and means to attach to a limb or neck to the lifeform or means of physical connection—i.e. touching of the skin to engage the lifeform recognition-sensor functions. This is not physically shown but implied FIG. 4A depicts a simplified exploded view of a lifeform transmitter [60] for the lifeform detection for the collision avoidance system of FIG. 1 to be worn around the neck of a pet, and FIG. 4B depicts a nonhuman (a dog) wearing the lifeform transmitter apparatus [60] of FIG. 4A. The collar of choice is made by Link AKC Smart Collar.

Figure 5A:
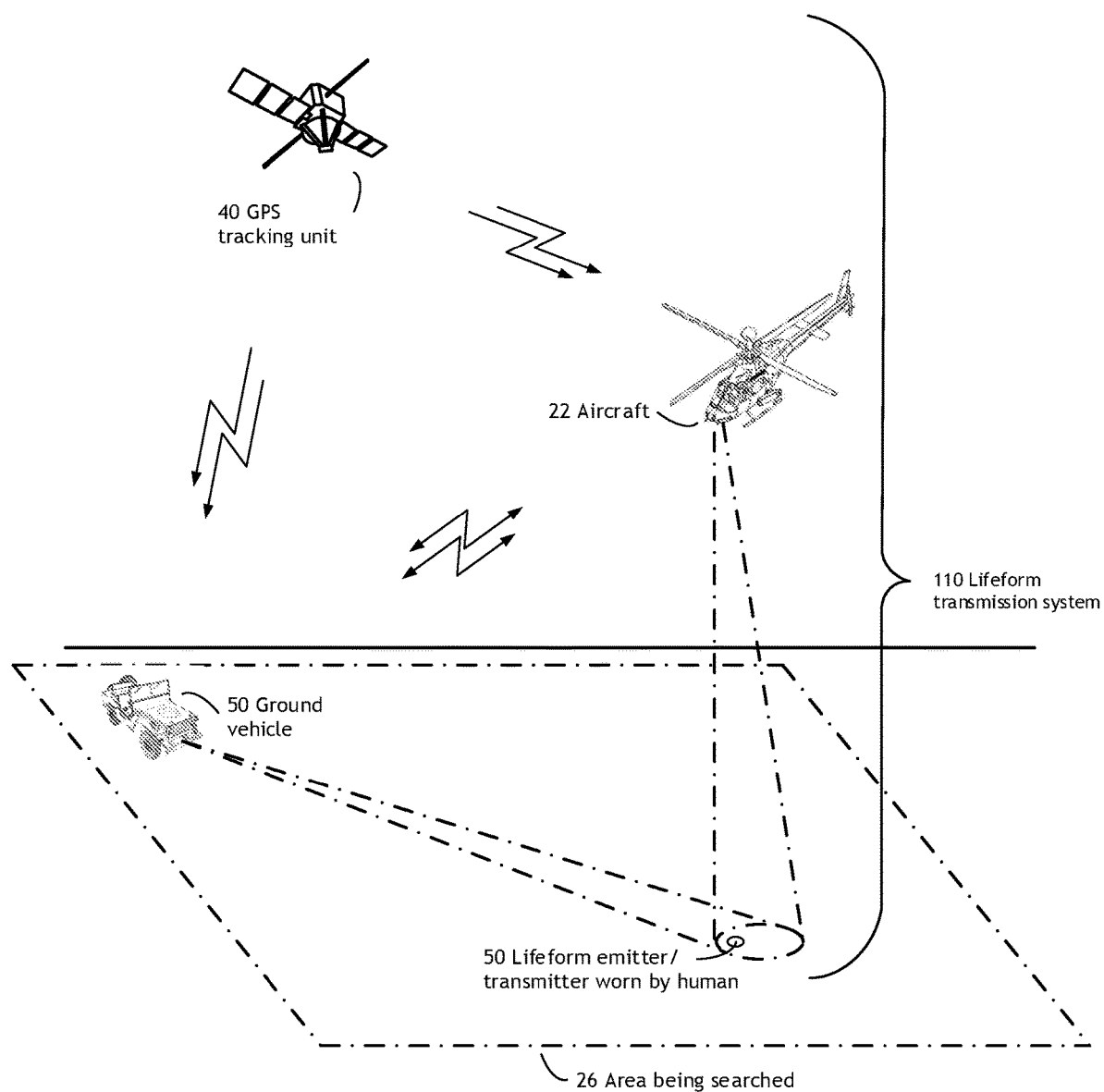
FIG. 5A depicts a simplified view of a second preferred embodiment of the lifeform transmission system of the present invention, whereby an aircraft (a helicopter) with an receiver scans quadrant coordinates in an area where the lifeform is or the in the path of the aircraft during landing or in flight. The helicopter detects the lifeform emitter/transmitter signal thereby focusing on this area.

FIG. 5A depicts a simplified view of a second preferred embodiment of the lifeform transmission system [110] of the present invention. An aircraft [22] (a helicopter) with a-detector/receiver [30] scans quadrant coordinates in an area [26] where the lifeform is. The aircraft communicates any findings to a ground vehicle [20] proximate to the area [26]. The receiver [30] in the ground vehicle [20] then transmits what is learned to the existing vehicular collision avoidance system and can locate the lifeform.

Figure 5B:
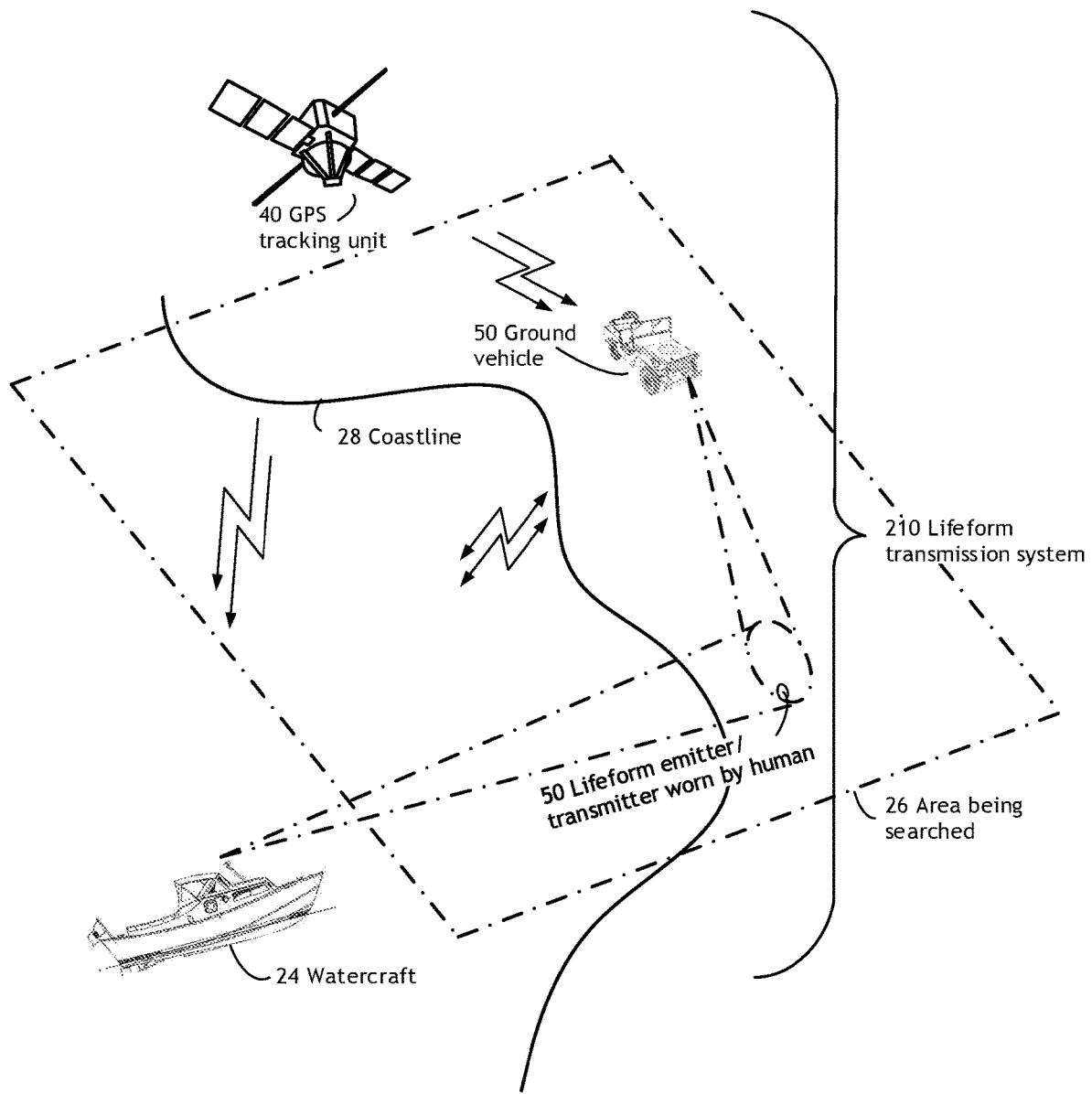
FIG. 5B depicts a simplified view of a third preferred embodiment of the lifeform transmission system of the present invention, whereby a watercraft with a receiver scans quadrant coordinates in an area where lifeform maybe or is along coastline. The watercraft communicates any findings to ground vehicle within the area. The watercraft recognizes the lifeform and can use watercraft controls to avoid collision.

FIG. 5B depicts a simplified view of a third preferred embodiment of the lifeform transmission system [210] of the present invention. A watercraft [24] with a receiver [30] scans quadrant coordinates in an area [26] where the lifeform is along a coastline [28]. The watercraft communicates any findings to a ground vehicle [20] with the area [26]. The receiver [30] in the ground vehicle [20] then transmits what is learned to the existing vehicular collision avoidance system. The watercraft recognizes the lifeform and can use watercraft controls to avoid collision.

Figure 5C:
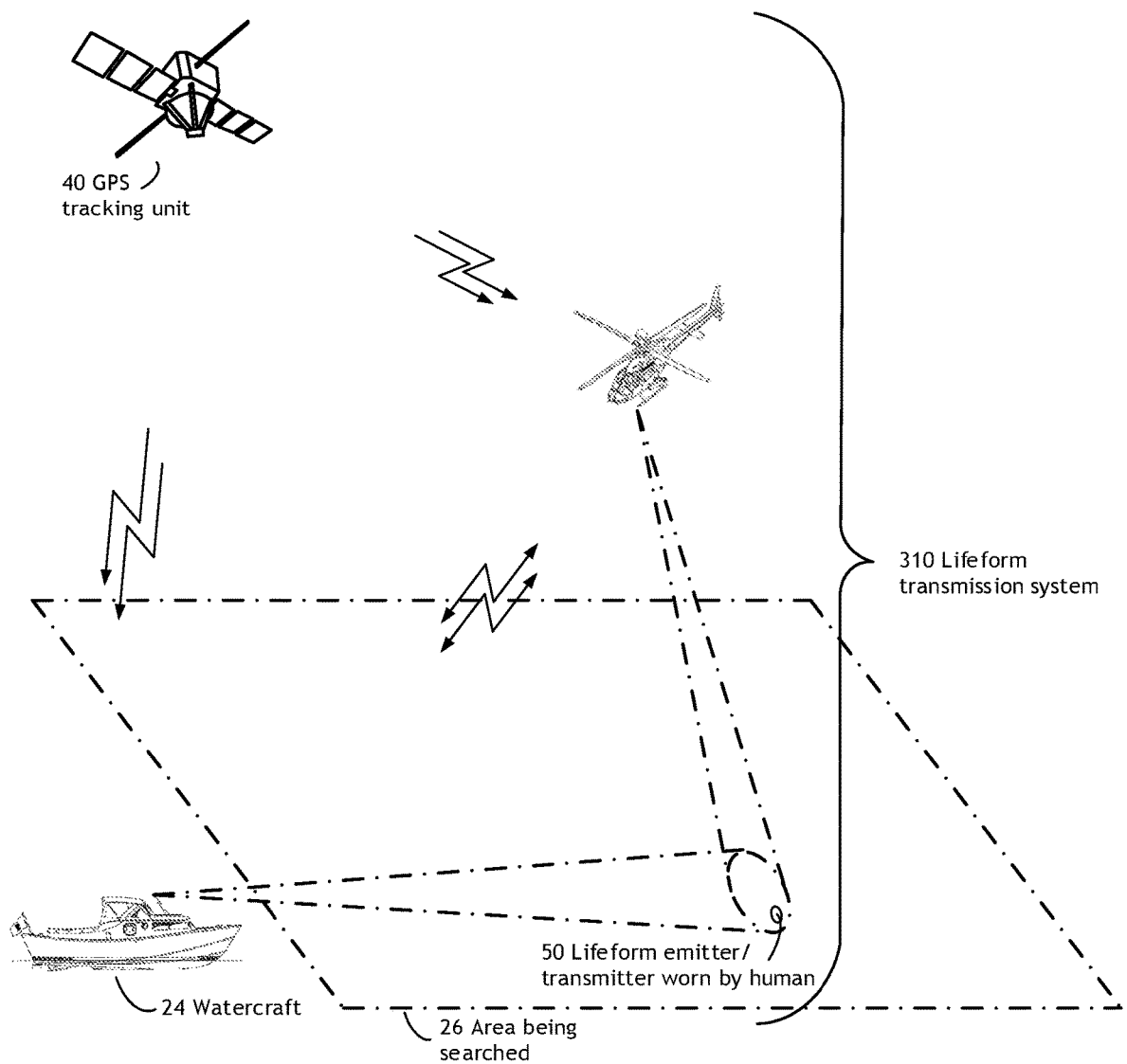
FIG. 5C depicts a simplified view of a fourth preferred embodiment of the lifeform transmission system of the present invention, whereby an aircraft with a receiver scans quadrant coordinates in an area, where lifeform is in the water, in 2 way communication with a watercraft. Watercraft has the detector for lifeform.

FIG. 5C depicts a simplified view of a fourth preferred embodiment of the lifeform transmission system [310] of the present invention. An aircraft [26] with a receiver [30] scans quadrant coordinates in an area [26] where the lifeform is in the water, in a 2-way communication with a watercraft [24]. Watercraft [24] has the detector [30] to locate lifeform [50].

Figure 6A:
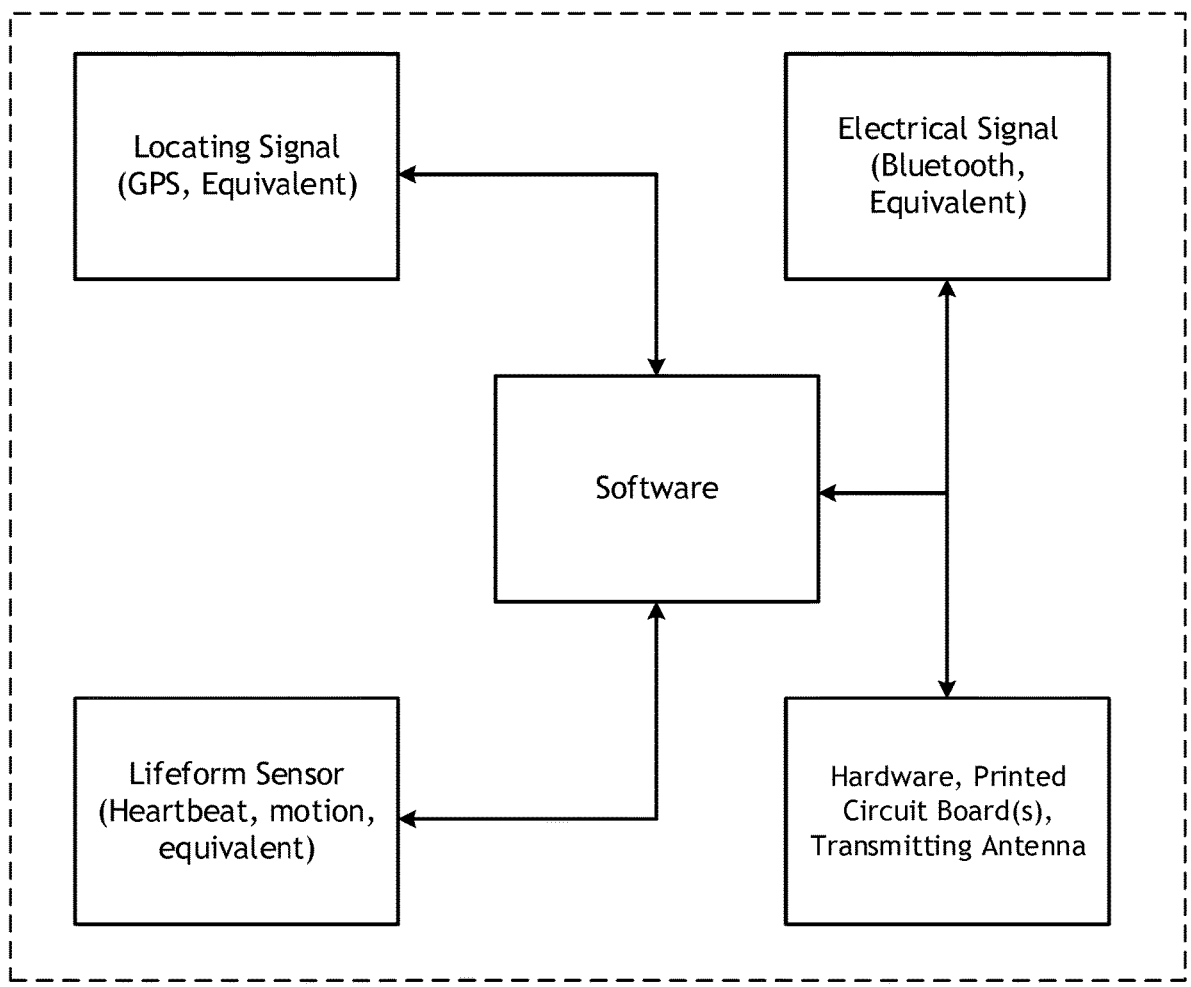
FIGS. 6A, 6B, and 6C depict preferred configurations for lifeform transmitter worn by lifeforms for the lifeform transmission system of the present invention as shown in FIGS. 1, 5A, 5B, and 5C.
Figure 6B:
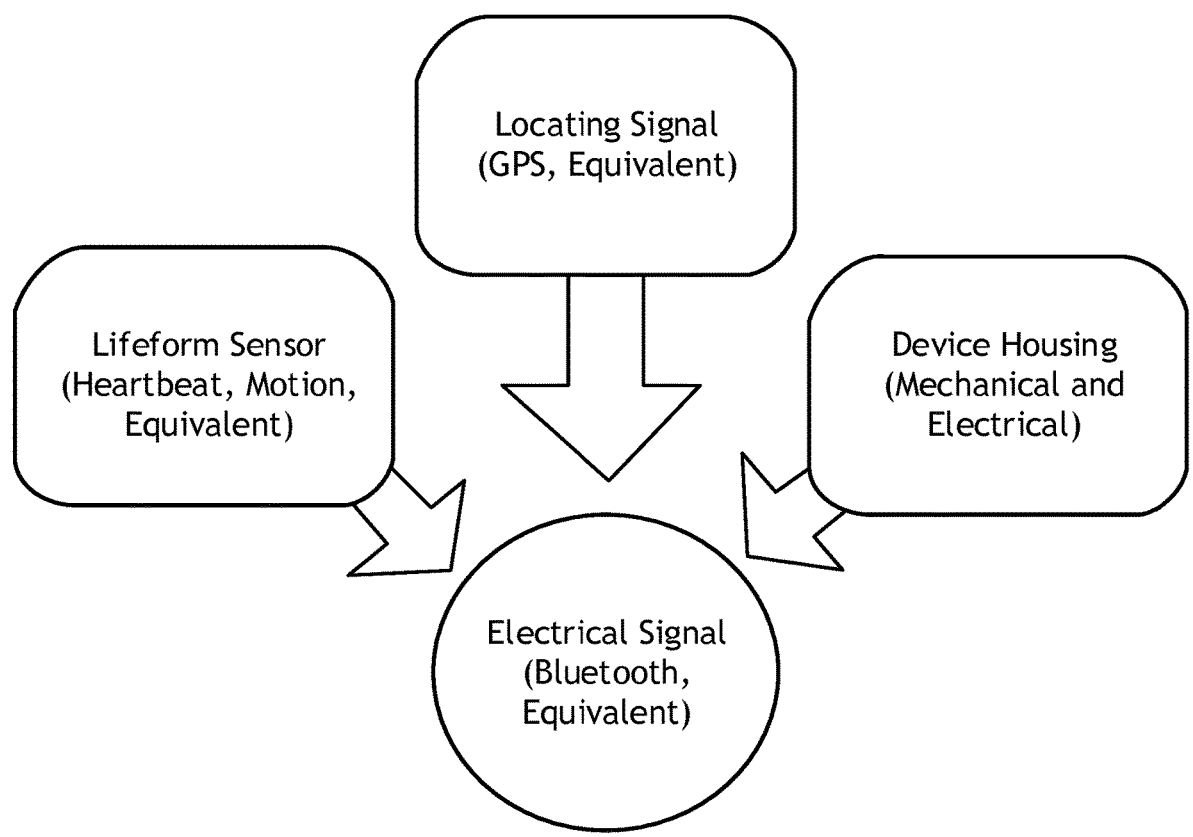

FIG. 6A depicts a schematic representation of a preferred embodiment of an emitter, including emitter software for the vital-signs sensor. The wearable transmitter [50] transmits a locating signal (GPS) using Bluetooth low power signal or other signal type/function. Moving vehicles use this signal to know that a lifeform wearing a detector is in proximity, updating the collision avoidance system of the vehicle, preventing a collision with the lifeform. In one preferred embodiment, the signal is only transmitted when the device senses lifeform vitals. A stationary device cannot generate this signal preventing misuse. In a second preferred embodiment, the signal continues to transmit, even absent lifeform vitals or motion, however the receiver receives a signal and recognizes the object as a non-lifeform.

Figure 6C:
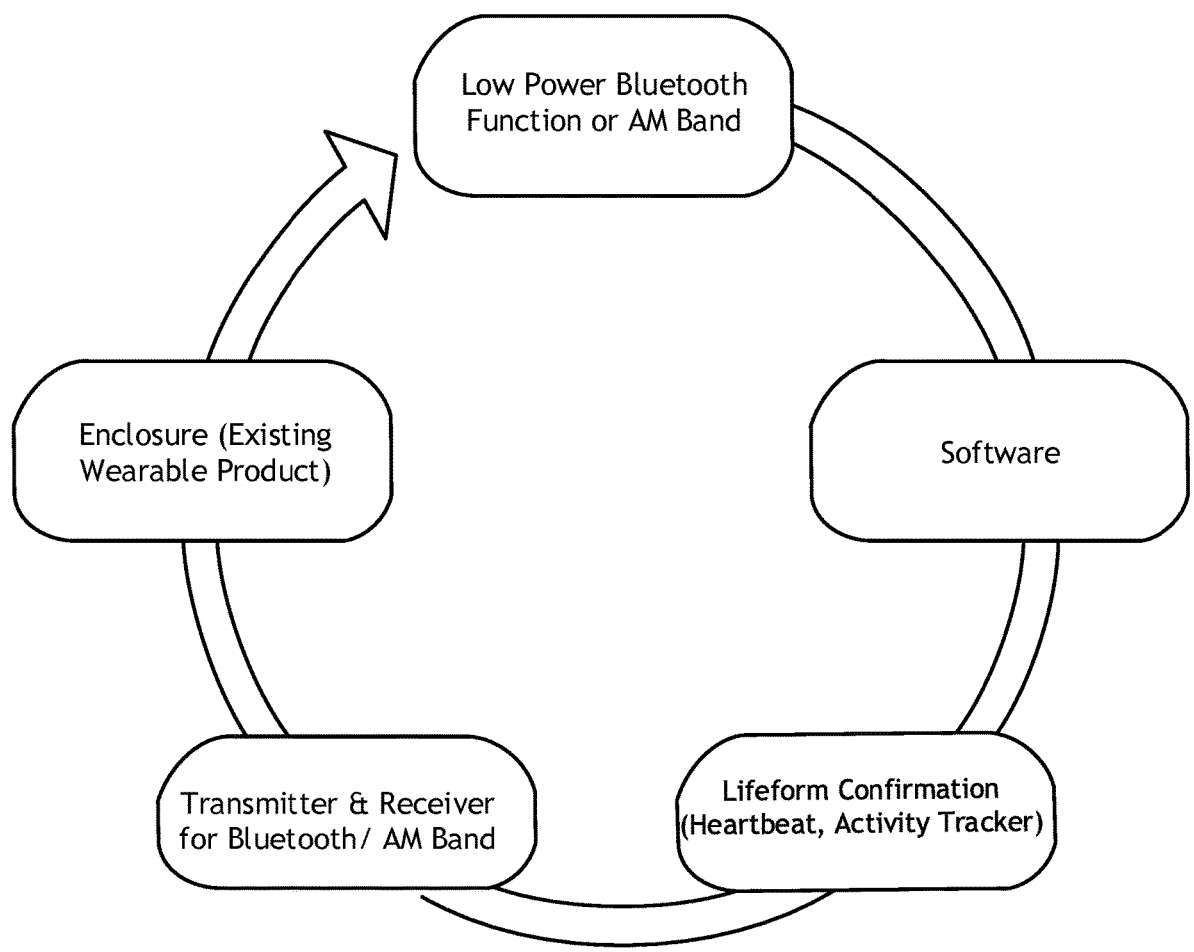

FIG. 6C depicts a schematic representation of a preferred embodiment of the transmitter [50] for the lifeform transmission system of the present invention, including the low power Bluetooth function or AM band, the software, technology to interact with vital sign sensors on a lifeform, a transmitter and a receiver for the low power Bluetooth or AM band, and an enclosure so that the product may be worn.

Figure 7:
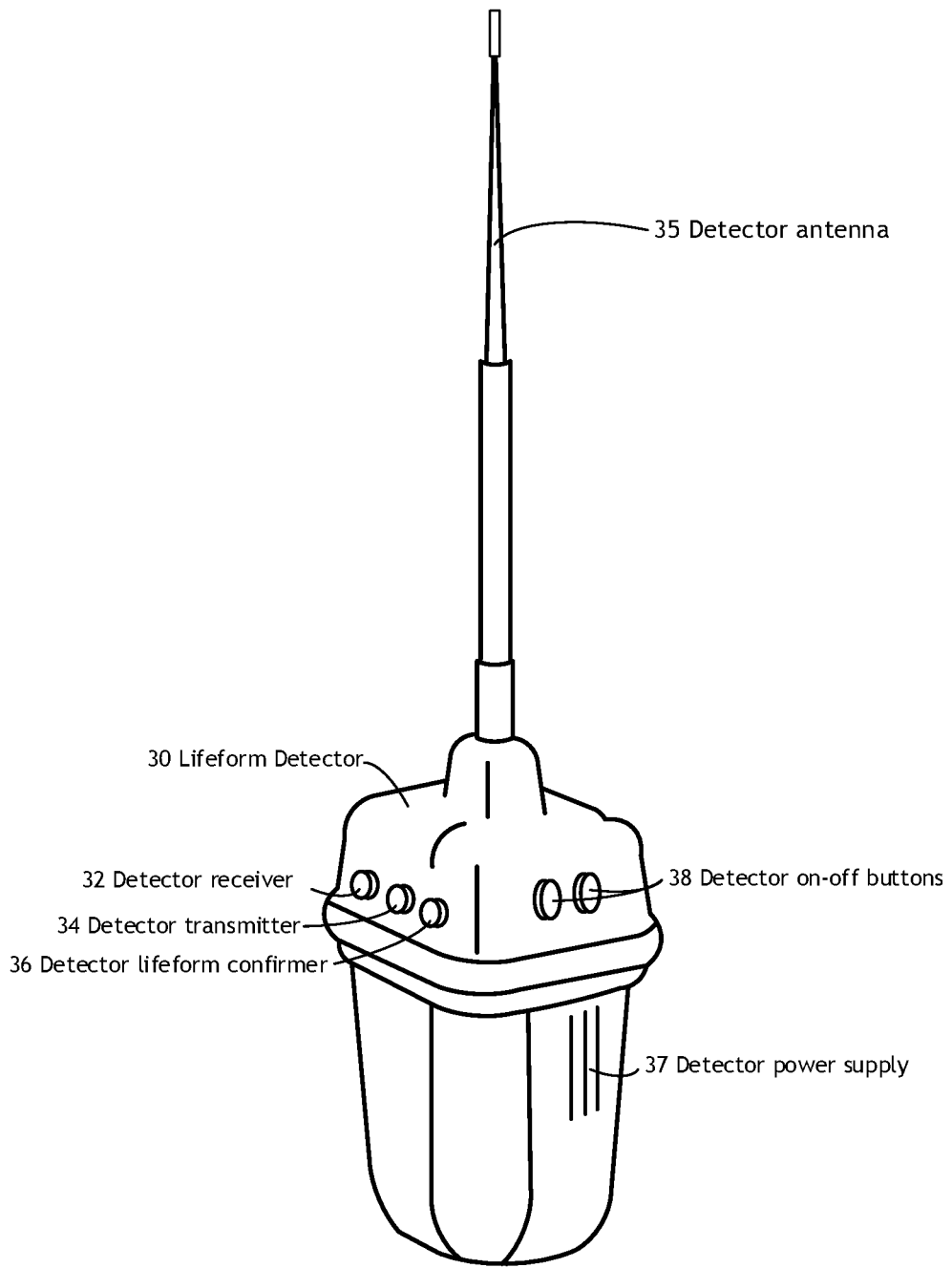
FIG. 7 depicts a simplified exploded view of the preferred embodiment of a receiver for use in the detection of a of FIGS. 1, 5A, 5B, and 5C.

FIG. 7 depicts a simplified exploded view of the preferred embodiment of a lifeform emergency emitter [30] for use in the lifeform transmission system of the present invention. The lifeform emergency emitter [30] includes an emitter antennae [32} for emitting signals remotely, an emitter power supply [37] and emitter on-off buttons [38] for shutting the lifeform emergency emitter [30] down and starting the lifeform emergency emitter [30] up.

Figure 8A:
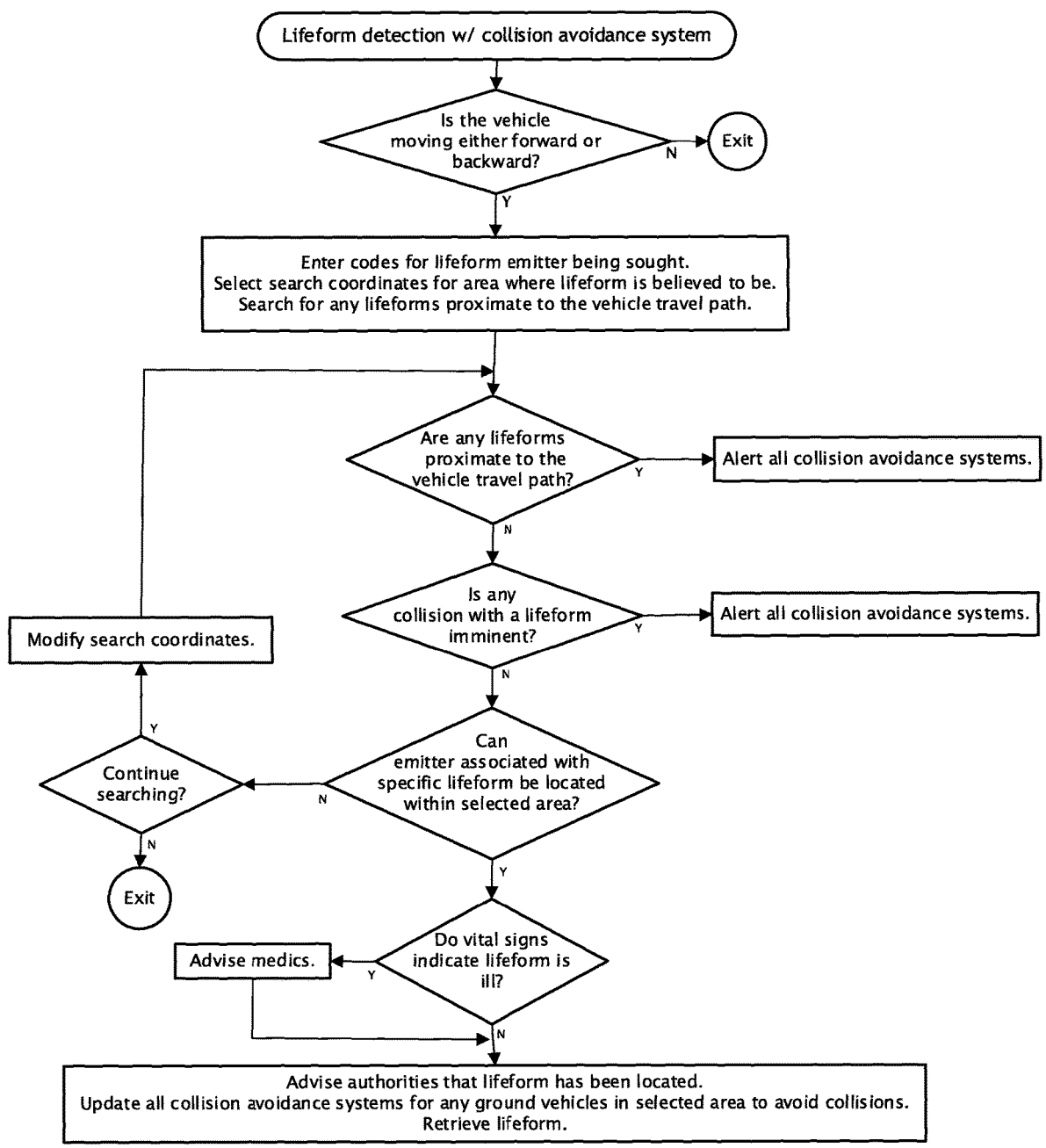
FIG. 8A depicts a simplified flowchart showing the first preferred embodiment of the lifeform transmission system of the present invention, a ground vehicle to search within quadrant coordinates where lifeform is while continuously alerting the collision avoidance system of any lifeform transmitters proximate to the ground vehicle travel path. This is only a demonstration into how the invention can help in this typical situation.

FIG. 8A depicts a simplified flowchart showing the first preferred embodiment of the lifeform transmission system [10] of the present invention, deploying a ground vehicle to search within quadrant coordinates where the lifeform is while continuously alerting the collision avoidance system of any lifeform emitters proximate to the ground vehicle travel path.

Figure 8B:
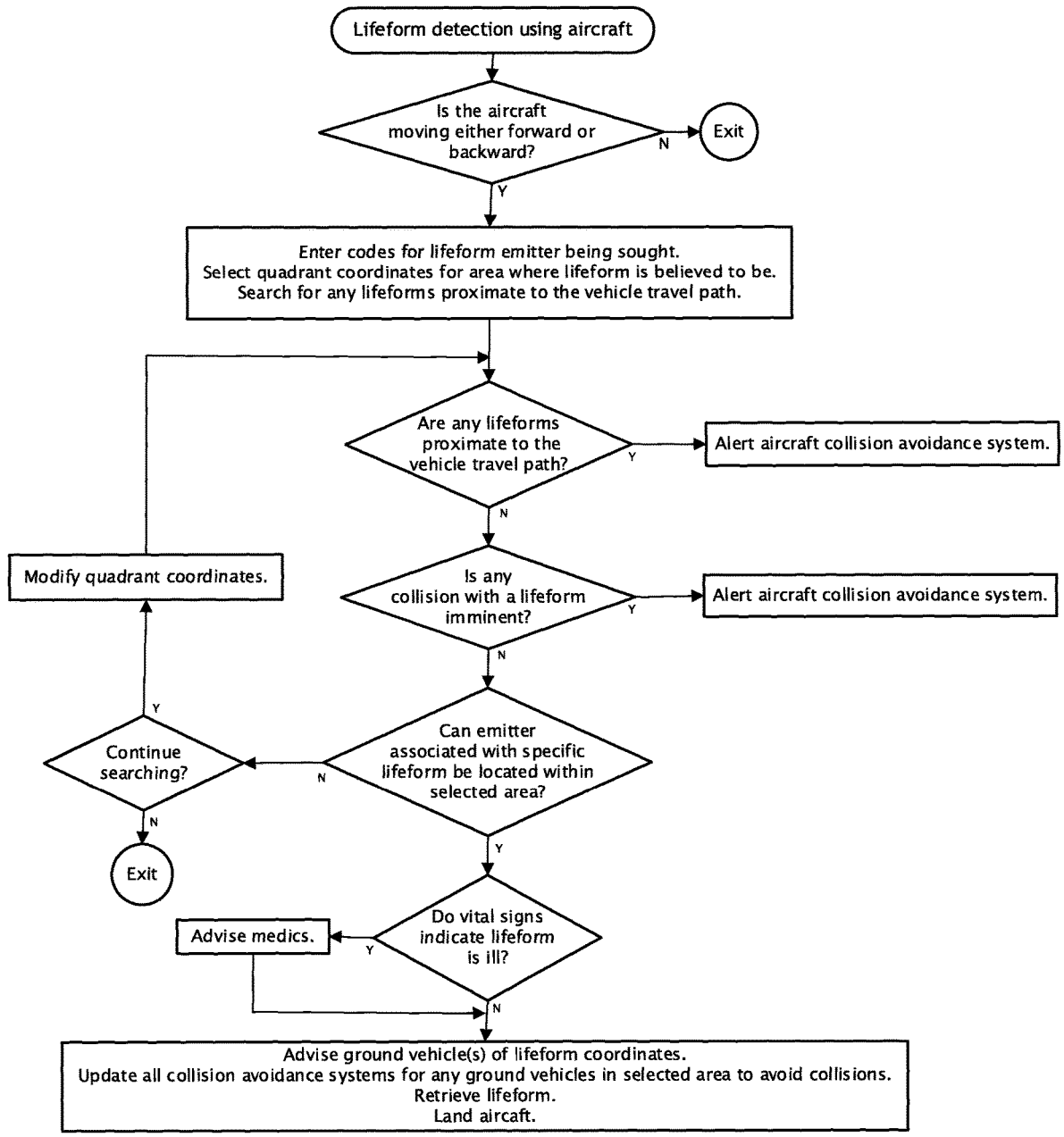
FIG. 8B depicts a simplified flowchart showing the second preferred embodiment of the lifeform transmission system of the present invention, an aircraft to search within quadrant coordinates where the lifeform is while continuously alerting the collision avoidance system of the aircraft of any lifeform transmitters proximate to the aircraft travel path, the aircraft coordinating with one or more ground vehicles. This is only a demonstration into how the invention can help in this typical situation.

FIG. 8B depicts a simplified flowchart showing the second preferred embodiment of the lifeform transmission system [110] of the present invention, deploying an aircraft to search within quadrant coordinates where the lifeform is while continuously alerting the collision avoidance system of the aircraft of any lifeform emitters proximate to the aircraft travel path, the aircraft coordinating with one or more ground vehicles [20].

Figure 8C:
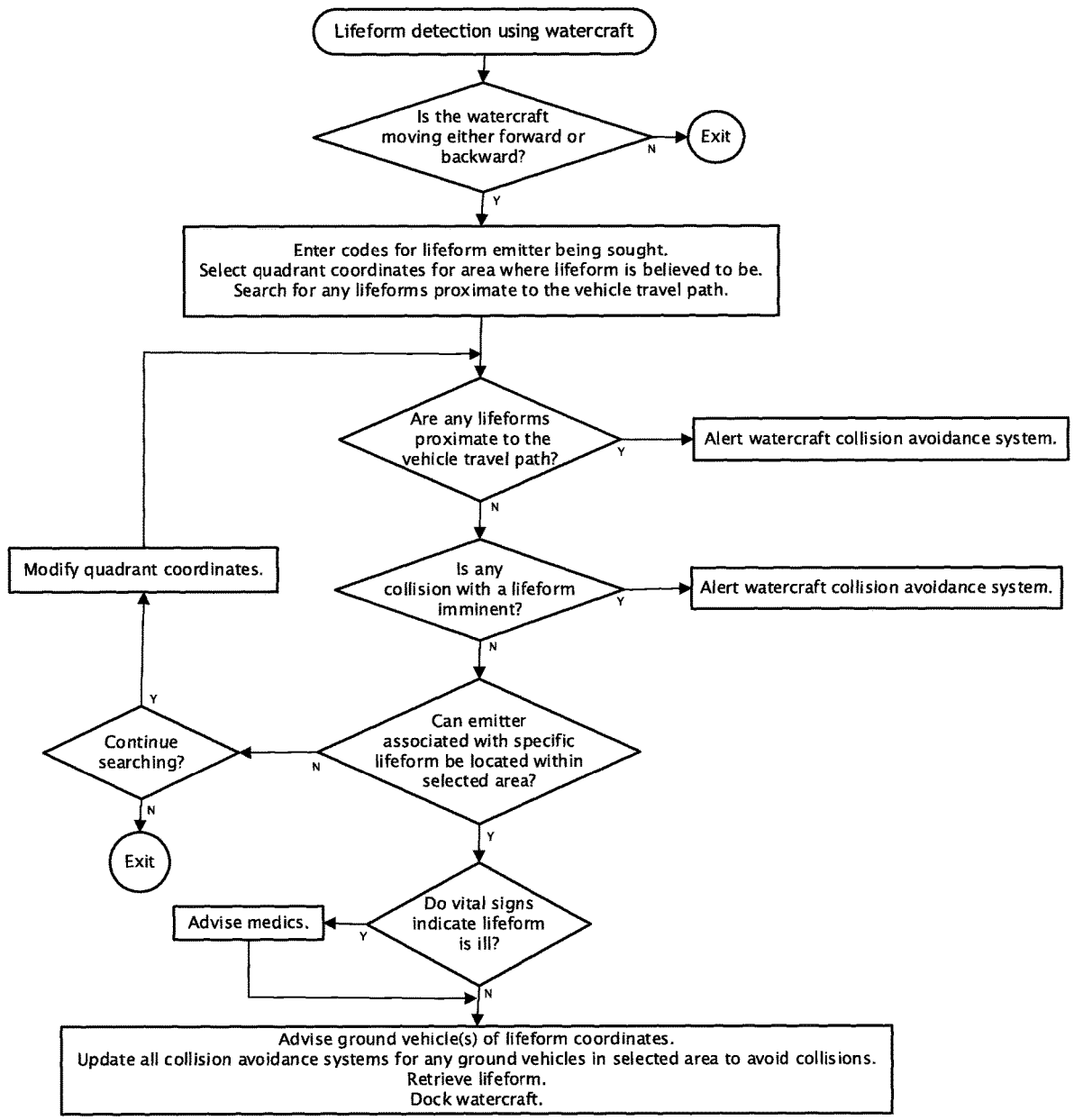
FIG. 8C depicts a simplified flowchart showing the third preferred embodiment of the lifeform transmission system of the present invention, a watercraft to search within quadrant coordinates where the lifeform is while continuously alerting the collision avoidance system of the watercraft of any lifeform transmitters proximate to the watercraft travel path, the watercraft coordinating with one or more ground vehicles. This is only a demonstration into how the invention can help in this typical situation.

FIG. 8C depicts a simplified flowchart showing the third preferred embodiment of the lifeform transmission system [210] of the present invention, deploying a watercraft [24] to search within quadrant coordinates where the lifeform is while continuously alerting the collision avoidance system of the watercraft of any lifeform emitters proximate to the watercraft [24] travel path, the watercraft coordinating with one or more ground vehicles [20].

Figure 8D:
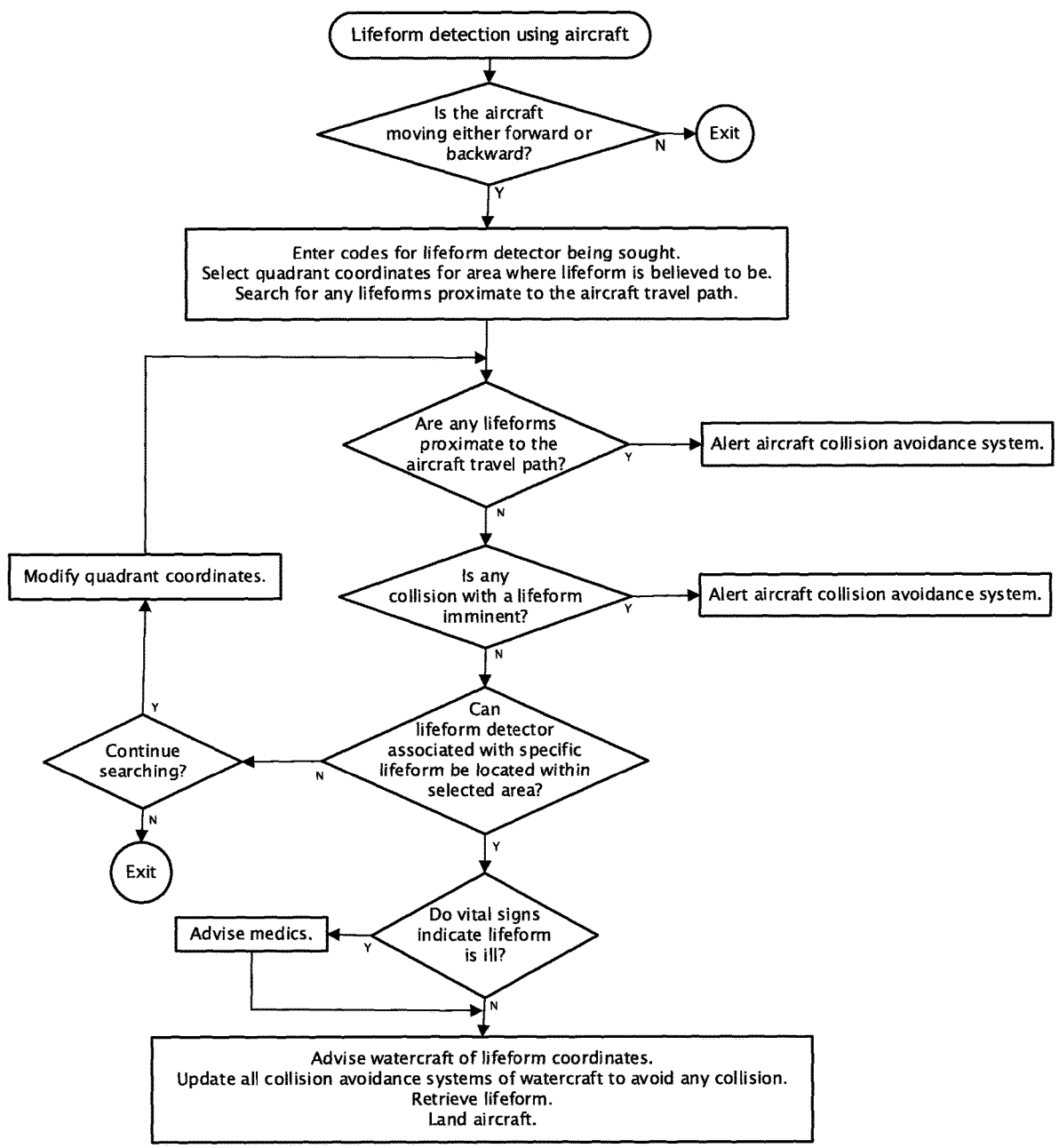
FIG. 8D depicts a simplified flowchart showing the fourth preferred embodiment of the lifeform transmission system of the present invention, an aircraft to search within quadrant coordinates where the lifeform is while continuously alerting the collision avoidance system of the aircraft of any lifeform detectors proximate to the aircraft travel path, the aircraft coordinating with one or more watercraft. This is only a demonstration into how the invention can help in this typical situation.

FIG. 8D depicts a simplified flowchart showing the fourth preferred embodiment of the lifeform transmission system [310] of the present invention, deploying an aircraft [22] to search within quadrant coordinates where the lifeform is while continuously alerting the collision avoidance system of the aircraft of any lifeform emitters proximate to the aircraft travel path, the aircraft [22] coordinating with one or more watercraft [24].

While the drawings represent a typical example where the lifeform transmission system of the present invention can be used, the lifeform transmission system is also fully compatible with a self-driving vehicle, a robot car, an autonomous car, or a driverless car.

The emitters/transmitters are preferably a Bluetooth transceiver that operates on Bluetooth protocols. As used herein, Bluetooth includes Bluetooth, ULP Bluetooth (Ultra Low Power Bluetooth), BLE (Bluetooth Low Energy), and other standards sets by Bluetooth SIG, Inc. In another exemplification, radio transceiver operates on RF protocols.

The external sensor may have a wireless communication function attained by Bluetooth and other equivalent technologies. Pre-existing radio equipment can be utilized to detect user activity. Modern automobiles are often equipped with Bluetooth technology. The sensor device enabled with Bluetooth senses the lifeform device transmitter through Bluetooth communication protocol. Once the emitter and vehicle are paired to each other, the system can be readily paired with the existing collision avoidance system of the vehicle.

The primary novel features a schematic diagram of the lifeform detection for collision avoidance system of the present invention are as follows:
- Worn, attached, or carried by various lifeforms such as, but not limited to, infants, children, adults, dogs, cats, other pets, and livestock.
- Vitals sensor used to identify the wearer as a lifeform (using temperature, pulse, motion, electrical stimuli, and the like.)
- Provides the communication loop between pedestrian and autonomous vehicle for increased certainty of collision avoidance.
- Augmenting autonomous (self-driving and autonomous) vehicles systems to make informed directional, path, and speed adjustments for recognized lifeforms using the device.
- May include lifeforms receiving information through the device acknowledging proximity or proximity of approaching vehicle.

Throughout this application, various Patents and Applications are referenced by number and inventor. The disclosures of these documents are hereby incorporated by reference in their entireties into this specification in order to more fully describe the state of the art to which this invention pertains.

It is evident that many alternatives, modifications, and variations of the lifeform detection for collision avoidance system of the present invention will be apparent to those skilled in the art in light of the disclosure herein. For example, the system can be used for personal use as well as by personal trainers and those with ailments, such as cerebral palsy, to aid them in improving their coordination. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LISTS

10 Lifeform transmission system—$1^{st}$ preferred embodiment
20 Ground vehicle
22 Aircraft
24 Watercraft
26 Area being searched
28 Coastline
30 Lifeform emergency emitter
35 Emitter antennae
37 Emitter power supply
38 Emitter on-off buttons
40 GPS tracking unit
42 GPS tag
43 Pulse detector
45 Pedestrian with backpack
46 Approaching vehicle
48 Running youth
50 Lifeform detector worn by a human
60 Lifeform detector worn by nonhuman lifeform
110 Lifeform transmission system—$2^{nd}$ preferred embodiment
210 Lifeform transmission system—$3^{rd}$ preferred embodiment
310 Lifeform transmission system—$4^{th}$ preferred embodiment

I claim:

1. A lifeform transmission system for locating a lifeform, said lifeform transmission system comprising: a lifeform emitter having an emitter processor, said emitter processor being electrically compatible with a global positioning satellite tracking unit, said lifeform emitter including an emitter housing, said emitter housing having a physical size and shape that can be worn by a lifeform, said lifeform being a human or pet, said emitter housing including an emitter sensor registered for said human or pet, said emitter sensor emitting a vital sign indicator of said human or pet; and a lifeform detector being electrically compatible with a global positioning satellite tracking unit, said lifeform detector having a detector processor, said detector processor being electrically compatible with said emitter processor, said lifeform detector being positioned relative to a vehicle, said lifeform detector using at least one of lidar, ladar, radar, Wi-Fi, laser, sonar, ultrasound, and radio-frequency technology to locate said lifeform emitter within coordinates of a pre-selected area$_1$ said detector processor searching within said coordinates of said pre-selected area to locate said human or pet wearing said emitter sensor.

2. The lifeform transmission system of claim 1, wherein said signal of said vital sign is only transmitted when said lifeform emitter is worn by said human or pet.

3. The lifeform transmission system of claim 1, wherein said vital sign indicator is a biometric.

4. The lifeform transmission system of claim 1, wherein said sensor is registered for said human or pet enabling identification.

5. The lifeform transmission system of claim 1, wherein said vital sign indicator is selected from the group consisting of the group of a heart rate, a changing heart rate, and a pulse.

6. A lifeform transmission system for locating a lifeform, said lifeform transmission system comprising: a lifeform emitter having an emitter processor, said emitter processor being electrically compatible with a global positioning satellite tracking unit, said lifeform emitter including an emitter housing, said emitter housing having a physical size and shape that can be worn by a lifeform, said lifeform being a human or pet, and said lifeform emitter further includes a emitting sensor transmitting a signal of a vital sign indicator of said human or pct, said vital sign indicator selected from the group consisting of a biometric, a heart rate, a changing heart rate, and a pulse, said emitting sensor is registered to said human or pet; and a lifeform detector being electrically compatible with a global positioning satellite tracking unit, said lifeform detector having a detector processor, said detector processor being electrically compatible with said emitter processor, said lifeform detector being positioned relative to a ground vehicle, said lifeform detector using at least one of lidar, ladar, radar, Wi-Fi, laser, sonar, ultrasound, and radio- frequency technology to locate said lifeform emitter within coordinates of a pre-selected area, said detector processor searching within said coordinates of said pre-selected area to locate said human or pet wearing said emitter sensor.

7. The lifeform transmission system of claim 6, wherein said lifeform detector is in communication with a collision avoidance system for said ground vehicle.

8. The lifeform transmission system of claim 7, wherein said detector processor processes said sensor of a signal of a vital sign indicator of said human or pet.

9. The lifeform transmission system of claim 7, wherein said lifeform detector forwards data to said collision avoidance system to avoid impact with any human or pet detected to be in a vehicle travel path of said ground vehicle.

10. The lifeform transmission system of claim 7, wherein said signal of said vital sign is only transmitted when said lifeform emitter is worn by said human or pet.

11. A lifeform transmission system for locating a lifeform, said lifeform transmission system comprising: a lifeform emitter having an emitter processor, said emitter processor being electrically compatible with a global positioning satellite tracking unit, said lifeform emitter including an emitter housing, said emitter housing having a physical size and shape that can be worn by a lifeform, said lifeform being a human or pet, said emitter housing including an emitter sensor registered to said human or pet, said emitter sensor transmits a vital sign indicator of said human or pet; and a lifeform detector being electrically compatible with a global positioning satellite tracking unit, said lifeform detector having a detector processor, said detector processor being electrically compatible with said emitter processor, said lifeform detector being positioned relative to a watercraft, said lifeform detector using at least one of lidar, ladar, radar, Wi-Fi, laser, sonar, ultrasound, and radio- frequency technology to locate said lifeform emitter within coordinates of a pre-selected area of said watercraft, said detector processor searching within said coordinates of said pre-selected area to locate said human or pet wearing said emitter sensor.

12. The lifeform transmission system of claim 11, wherein said lifeform detector emitter is in communication with a collision avoidance system to prevent a collision with said human or pet.

13. The lifeform transmission system of claim 11, wherein said vital sign indicator is a biometric.

14. The lifeform transmission system of claim 11, wherein said signal of said vital sign indicator is only transmitted when said lifeform emitter is worn by said human or pet.

15. The lifeform transmission system of claim 11, wherein said vital sign indicator is selected from the group consisting of a heart rate, a changing heart rate, and a pulse.

16. A lifeform transmission system for locating a lifeform, said lifeform transmission system comprising: a lifeform emitter having an emitter processor, said emitter processor being electrically compatible with a global positioning satellite tracking unit, said lifeform emitter including an emitter housing, said emitter housing having a physical size and shape that can be worn by a lifeform, said lifeform being a human or pet, said emitter housing including an emitter sensor registered for said human or pet, said emitter sensor emitting a vital sign indicator of said human or pet; and a lifeform detector being electrically compatible with a global positioning satellite tracking unit, said lifeform detector having a detector processor, said detector processor being electrically compatible with said emitter processor, said lifeform detector being positioned relative to an aircraft, said lifeform detector using at least one of lidar, ladar, radar, Wi-Fi, laser, sonar, ultrasound, and radio-frequency technology to locate said lifeform emitter within coordinates of a pre-selected area of said aircraft, said detector processor searching within said coordinates of said pre- selected area to locate said human or pet wearing said emitter sensor.

17. The lifeform transmission system of claim 16, wherein said lifeform detector is in communication with a collision avoidance system for said aircraft to prevent a collision with said human or pet.

18. The lifeform transmission system of claim 16, wherein said vital sign indicator is a biometric.

19. The lifeform transmission system of claim 16, wherein said signal of said vital sign is only transmitted when said lifeform emitter is worn by said human or pet.

20. The lifeform transmission system of claim 16, wherein said vital sign indicator is selected from the group consisting of the group of a heart rate, a changing heart rate and a pulse.

* * * * *